Patented June 13, 1950

2,511,244

UNITED STATES PATENT OFFICE 2,511,244

METHOD OF PURIFYING NICOTINAMIDE

Gustaf H. Carlson, Detroit, Mich., assignor to R. P. Scherer Corporation, Detroit, Mich., a corporation of Michigan No Drawing. Application July 9, 1949, Serial No. 103,943

6 Claims. (Cl. 260—245.5)

This invention relates to a method of purifying nicotinamide. More particularly, the invention relates to a method for removing nicotinic acid from mixtures thereof with nicotinamide, such as are obtained when nicotinamide is prepared by reaction of nicotinic acid with gaseous ammonia.

An important object of the present invention is to provide a method for treating mixtures of nicotinamide and nicotinic acid, for the purpose of removing the nicotinic acid from the nicotinamide and for further purifying the nicotinamide after the removal of the nicotinic acid.

Other and further objects and features will become apparent to those skilled in the art from the following description and appended claims.

In proceeding according to the present invention, nicotinamide containing nicotinic acid is first dissolved at an elevated temperature in an aliphatic ketone having a boiling point higher than the boiling point of water, and preferably not greater than about 165° C. I have found that the aliphatic ketones in question are excellent solvents both for nicotinic acid and nicotinamide at elevated temperatures (at least 60° C. and preferably 100° C. or higher).

To the solution so obtained, I add both calcium hydroxide and water, preferably in the form of an aqueous calcium hydroxide slurry. The calcium hydroxide is added in an amount at least equivalent to the nicotinic acid present. For this reason, I prefer to determine analytically the nicotinic acid content of the nicotinic acid-nicotinamide mixture before the mixture is dissolved in the ketone. Preferably I add a slight excess of calcium hydroxide, for instance, 10%.

I have found that calcium nicotinate is insoluble in the ketones above referred to even at an elevated temperature. I have further found that when water is added along with the calcium hydroxide, then calcium nicotinate is formed relatively rapidly, say, within one-half hour. The end point of the calcium hydroxide-nicotinic acid reaction can easily be determined by taking a sample of the solution to which the calcium hydroxide has been added, filtering the sample, diluting the filtrate with an equal amount of water, and determining the pH of the diluted filtrate. When the pH thus determined is 10 or higher, then the reaction between the calcium hydroxide and the nicotinic acid is complete.

If the calcium hydroxide is added to the ketone solution without incorporating water with the latter, then calcium nicotinate is formed so slowly that complete reaction between the nicotinic acid and the calcium hydroxide may never be effected or else only effected after several days. The amount of water to be added is not critical. Complete reaction between nicotinic acid and calcium hydroxide will take place even when only ½% or 1% (by volume of the ketone) has been added.

After complete reaction between calcium hydroxide and nicotinic acid has been effected, the mixture is heated sufficiently to drive off the water. After the water has been driven off, activated carbon may be added. The mixture is then filtered for removal of the calcium nicotinate.

Calcium nicotinate is appreciably soluble in hot water, as are also certain colored impurities formed in the reaction between nicotinic acid and ammonia. If the water were not removed before the filtration, some of the calcium nicotinate as well as the colored impurities would be carried over into the filtrate.

The filtrate so obtained will have dispersed therein small amounts of basic material, even though the filtrate may be clear. For removing this basic material, I add to the filtrate a small amount of finely divided silica, such as granulated silica gel or fine sand. Some water is added along with this silica. The resulting mixture is agitated continuously for several hours at an elevated temperature (at least 60° C. and preferably at least 100° C.). The added silica will absorb any residual calcium hydroxide and/or calcium nicotinate or other basic material. If no water is added along with the silica, complete absorption will take several days. In the presence of the added water, on the other hand, absorption is completed within several hours. The amount of water added is not critical. As little as ½% or 1% is sufficient.

The end point of the absorption can be determined by filtering a sample of the nicotinamide solution, cooling the filtrate to cause crystallization of the nicotinamide, filtering off the crystallized nicotinamide, dissolving the nicotinamide as a 10% aqueous solution, and determining the pH of the aqueous solution. When the pH is found to be 8.0 or less, the absorption by the silica of the calcium hydroxide is satisfactory.

When the absorption of the basic material by the silica has been completed, the mixture is heated to drive off the water and thereafter filtered. The water is removed to prevent the loss of nicotinamide due to its solubility in water. The filtrate is chilled to cause the nicotinamide to crystallize out. The crystallized amide may be recovered by filtration or centrifuging and will be found to be remarkablly pure. The final filtrate will contain practically all the impurities present in the original nicotinamide-nicotinic acid mixture.

Among the ketones that may be used, I mention the following: Methyl isobutyl ketone, ethyl propyl ketone, methyl amyl ketone and ethyl butyl ketone. The aliphatic ketones such as these ketones possess in common the ability to dissolve both nicotinic acid and nicotinamide at high temperatures but do not dissolve calcium nicotinate at a high temperature. Further, at low temperatures the ketones are very poor solvents for nicotinamide but excellent solvents for the impurities formed when nicotinamide is synthesized by reaction between nicotinic acid and gaseous ammonia. Finally, since the boiling points of these ketones substantially exceed the boiling point of water, water can easily be driven off from these ketones. Note that after water has been added, the nicotinamide solution is maintained at below 100° C. until the water is boiled off before the filtration steps. However, the temperature is not allowed to fall to a point where the nicotinamide will crystallize out. In general, the temperature should be at least 60° C.

The amount of ketone employed is sufficient to keep the nicotinamide in solution until cooled, and is limited so as to bring about crystallization on cooling. The exact amount of ketone to be used varies somewhat with the specific ketones.

By way of a specific example, I describe hereinbelow the handling of a commercial batch of nicotinamide with methyl isobutyl ketone. In this case, I started with a fused nicotinamide-nicotinic acid mixture obtained by treatment of 225 pounds of molten nicotinic acid with gaseous ammonia according to a conventional method. This fused mixture was added, during a period of approximately ten minutes, to 170 gallons of methyl isobutyl ketone having an initial temperature of about 60° C. The temperature rose during this addition to about 100° C. After dissolution had been effected, the solution was treated with a slurry of 21 pounds of calcium hydroxide in approximately 5 gallons of water and agitated for about 30 minutes, when the above indicated test showed a pH of slightly more than 10. At this time the mixture was gradually heated to 116° C. to remove the water. To the residual slurry I added 4 pounds of activated carbon and sometime thereafter filtered the mixture. The filtrate was agitated for approximately 12 hours at 100° C. with a slurry of 15 pounds of fine sand in water. Thereafter the mixture was gradually heated to 116° C. to remove the water and, when a test portion treated as disclosed hereinabove shows a pH of not quite 8.0, the mixture was filtered. The filtrate was chilled to 20° C. and the crystallized nicotinamide was collected by centrifuging.

Many details in composition and procedure may be varied within a wide range without departing from the principles of this invention and it is therefore not my purpose to limit the patent granted on this invention otherwise than necessitated by the scope of the appended claims.

I claim:

1. A method of separating nicotinic acid from a mixture of nicotinamide with nicotinic acid, said method comprising dissolving said mixture in an aliphatic ketone having a boiling point substantially higher than the boiling point of water, adding to the resulting solution both water and sufficient calcium hydroxide to cause conversion of said nicotinic acid to calcium nicotinate, driving off the added water by heating, filtering off the resulting precipitate of calcium nicotinate, adding water and finely divided silica to the resulting filtrate for absorbing retained basic material, driving off the added water, and filtering off the added silica.

2. A method of purifying nicotinamide admixed with nicotinic acid, said method comprising dissolving said nicotinamide in an aliphatic ketone having a boiling point substantially higher than the boiling point of water, adding to the resulting solution both water and sufficient calcium hydroxide to cause conversion of nicotinic acid to calcium nicotinate, driving off the added water by heating, filtering off the resulting precipitate of calcium nicotinate, adding water and finely divided silica to the resulting filtrate for absorbing retained basic material, driving off the added water by heating, filtering off the added silica, cooling the resulting filtrate to cause crystallization of the nicotinamide, and recovering the crystallized nicotinamide.

3. A method of separating nicotinic acid from a mixture of nicotinamide with nicotinic acid, said method comprising dissolving said mixture in an aliphatic ketone having a boiling point substantially above 100° C. but not higher than about 165° C., adding to the resulting solution both water and sufficient calcium hydroxide to cause conversion of said nicotinic acid to calcium nicotinate, boiling said solution to drive off the added water, filtering off the resulting precipitate of calcium nicotinate while said solution is still hot, adding water and finely divided silica to the resulting filtrate for absorbing retained basic material, boiling the solution to drive off the added water, and filtering off the added silica while the solution still is hot.

4. A method of purifying nicotinamide admixed with nicotinic acid, said method comprising dissolving said mixture at an elevated temperature in an aliphatic ketone having a boiling point substantially above 100° C. but not higher than about 165° C., adding to the resulting hot solution both water and sufficient calcium hydroxide to cause conversion of said nicotinic acid to calcium nicotinate, boiling said solution to drive off the added water, filtering off the resulting precipitate of calcium nicotinate while said solution still is hot, adding water and finely divided silica to the resulting hot filtrate for absorbing retained basic material, boiling said solution to drive off the added water, filtering off the added silica while said solution is still hot, cooling the resulting filtrate to cause crystallization of the nicotinamide, and recoving the crystallized nicotinamide.

5. A method of separating nicotinic acid from a mixture of nicotinamide with nicotinic acid, said method comprising dissolving said mixture in methyl isobutyl ketone at an elevated temperature, adding to the resulting hot solution both water and sufficient calcium hydroxide to cause conversion of said nicotinic acid to calcium nicotinate, driving off the added water by heating, filtering off the resulting precipitate of calcium nicotinate from the hot solution, adding water and finely divided silica to the resulting hot filtrate for absorbing retained basic material, heating the solution to drive off the added water, and filtering off the added silica while the solution still is hot.

6. A method of purifying nicotinamide containing admixed nicotinic acid, said method comprising dissolving said nicotinic acid in methyl isobutyl ketone, adding to the resulting solution both water and sufficient calcium hydroxide to cause conversion of said nicotinic acid to calcium nicotinate, boiling said solution to drive off the added water, filtering off the resulting precipitate of calcium nicotinate from the hot solution, adding water and finely divided silica to the resulting hot filtrate for absorbing retained basic material, boiling said solution to drive off the added water, filtering off the added silica, cooling the resulting filtrate to cause crystallization of the nicotinamide, and recovering the crystallized nicotinamide.

GUSTAF H. CARLSON.

No references cited.